United States Patent
Boege et al.

(10) Patent No.: US 6,726,798 B2
(45) Date of Patent: *Apr. 27, 2004

(54) POLYSTYRENE BINDERS

(75) Inventors: Kai Boege, Duesseldorf (DE); Michael Dziallas, Haan (DE); Klaus Helpenstein, Moenchengladbach (DE); Wolfgang Klauck, Meerbusch (DE); Johann Klein, Duesseldorf (DE); Helmut Loth, Essen (DE); Hartmut Urbath, Wuppertal (DE); Udo Windhoevel, Monheim (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 348 days.

(21) Appl. No.: 09/011,614

(22) PCT Filed: Aug. 2, 1996

(86) PCT No.: PCT/EP96/03416
§ 371 (c)(1),
(2), (4) Date: Feb. 11, 1998

(87) PCT Pub. No.: WO97/07173
PCT Pub. Date: Feb. 27, 1997

(65) Prior Publication Data
US 2003/0188828 A1 Oct. 9, 2003

(30) Foreign Application Priority Data
Aug. 11, 1995 (DE) ......................... 195 31 849

(51) Int. Cl.$^7$ ............................. C09J 109/00
(52) U.S. Cl. ................... 156/334; 524/300; 524/379
(58) Field of Search .................. 524/300, 379, 524/380, 315, 313; 156/334

(56) References Cited

U.S. PATENT DOCUMENTS

| 2,413,258 | A | * | 10/1946 | Soday | 524/300 |
| 2,492,124 | A | * | 12/1949 | Young et al. | 524/313 |
| 3,862,067 | A | * | 1/1975 | Motier et al. | 524/313 |
| 4,274,987 | A | * | 6/1981 | Augustyn | 524/315 |
| 4,323,490 | A | | 4/1982 | Topfl | |
| 4,869,934 | A | | 9/1989 | Jethwa | |
| 5,004,763 | A | * | 4/1991 | Imagawa | 524/313 |
| 5,182,323 | A | * | 1/1993 | Russell | 524/300 |

FOREIGN PATENT DOCUMENTS

| CN | 1 065 673 | | 10/1992 | |
| CZ | 259 825 | | 3/1989 | |
| DE | 233291 | * | 2/1986 | 524/315 |
| DE | 3 638 224 | | 5/1988 | |
| EP | 0 038 295 | | 10/1981 | |
| EP | 0 256 467 | | 2/1988 | |
| JP | 58-190878 | * | 11/1983 | 156/334 |
| JP | 04 091150 | | 3/1992 | |
| PL | 119 091 | | 4/1978 | |
| WO | WO95/11284 | | 4/1995 | |

OTHER PUBLICATIONS

"Kleben: Grundlagen, Technologie, Anwendungen", 2nd. ed., p. 100 (1990).

Ullmans Encyklopaedie der technischen Chemie, vol. 24, 4th ed.: 371–377 (1983).

Plastilit 3060, BASF technische information, TI/ED 1115 d–1 (Jan. 1984).

* cited by examiner

*Primary Examiner*—Jeff H. Aftergut
*Assistant Examiner*—Jessica Rossi
(74) *Attorney, Agent, or Firm*—Stephen D. Harper; Glenn E. J. Murphy

(57) ABSTRACT

The invention relates to polystyrene binders modified by fatty compounds. The fatty compounds used are, in particular, esters of fatty acids or fatty alcohols, more especially triglycerides of higher fatty acids, preferably natural fats and oils. They may be added to the binder in high concentrations without adversely affecting the properties of the binder. However, their addition is of advantage in regard to the wetting properties, resistance to water and, above all, hardness. Dispersion adhesives, hotmelt adhesives and sealing compounds in particular can be improved with the binders according to the invention.

22 Claims, No Drawings

POLYSTYRENE BINDERS

BACKGROUND OF THE INVENTION

1. Field of the Invention

This invention relates to binders based on homopolymers or copolymers of styrene, to their production and to their use for bonding, coating and sealing.

Binders in the context of the invention are substances which are capable of bonding or firmly adhering to substrates of the same or different types. They are generally based on substances, especially polymers, which set chemically or physically. Physical setting consists in solidification from the melt or in the drying of an aqueous or organic solution or dispersion. The substances or rather polymers are generally modified by additives in such a way that they are more suitable for bonding, adhesive sealing and coating. Corresponding additives are, for example, resins, plasticizers, solvents, fillers, pigments, accelerators, stabilizers and dispersants. Accordingly, the adhesives, sealing compounds and coating compounds are based on correspondingly modified binders.

2. Discussion of Related Art

Plasticizers are added to improve the plasticity or to reduce the hardness of adhesives, sealing compounds and coating compositions. Plasticizers are liquid or solid, generally inert organic substances of low vapor pressure. According to general expert knowledge (see Habenicht, Gerd: "Kleben: Grundlagen, Technologie-Anwendungen", 2nd Edition,1990, page 100), the disadvantage of plasticizer-containing adhesive layers lies in their impaired ageing and adhesion properties and in the reduced strengths of the adhesive layer and in its tendency to creep and migrate. Accordingly, well-balanced consideration has to be given to the priorities between plasticity on the one hand and strength of the other hand. In "Ullmanns Encyclopädie der technischen Chemie", the use of plasticizers is also described under the keyword "Weichmacher (Plasticizer)" (see pages 371 to 377, Vol. 24, 4th Edition, 1983).

Corresponding compositions of polystyrene and plasticizers are known. Thus, U.S. Pat. No. 4,869,934 describes a composition for the smoothing, cleaning and coating of floors which consists, for example, of the following components: 31.2 parts by weight of a copolymer of butyl methacrylate, methacrylic acid, methyl methacrylate and styrene in a ratio of 10:18:52:20, 1.6 parts by weight of the permanent plasticizer $(BuOCH_2CH_2O)3PO$ and 7.0 parts by weight of the volatile plasticizer $Me(OC_3H_6)_2OH$ and around 48 parts by weight of water. This known composition has the disadvantage that the volatile plasticizers at least pollute the environment or are even toxic.

The product "Plastilit 3060" is described in BASF's Technical Information Pamphlet TI/ED 1115 d-1 of January 1984. This product is a polypropylene glycol alkylphenyl ether which is used as a plasticizer for polymer dispersions, more especially for polyacrylates. The polymers specifically mentioned include a copolymer of styrene and butyl acrylate and a copolymer of ethyl acrylate, ethyl hexyl acrylate and acrylonitrile. Corresponding compositions may be used, for example, as sealing compounds with rapid skin formation after application, with relatively little post-curing and with better elongation behavior at low temperatures. In addition, they form with fillers paste-like tile adhesives which combine high tensile strengths with high elasticity. The plasticizer has an elasticizing effect on the copolymer without significantly impairing the water absorption of the film. Thus, the elongation of a film increases substantially linearly from around 300% to 4,000% where 9% of plasticizer is added. So far as the biological activity of the plasticizer is concerned, it is said not to be a health risk although prolonged exposure may well result in irritation of the skin and mucous membrane.

The same disadvantages also apply to the following two publications. Polish patent PL 119091 describes a non-toxic and non-inflammable adhesive for ceramics and plastics which, in addition to an acrylate/styrene dispersion, contains polypropylene glycol alkylphenyl ether, fillers, organic solvents and water.

German patent DE 36 38 224 describes an elastic sealing material which contains a styrene/butadiene rubber, an α-methyl styrene polymer, solvents, such as hydrocarbons and aromatic hydrocarbons, and polypropylene glycol alkylphenyl ether.

Czechoslovakian patent CS 259825 describes a contact adhesive for labels and tapes which mainly contains a copolymer of acrylates, unsaturated carboxylic acids and, optionally, styrene, alkyl styrene or vinyl acetate. Other components are organic solvents, plasticizers such as, for example, polyethylene glycol and polypropylene glycol.

Against the background of this prior art, the problem addressed by the present invention was to provide a toxicologically safe composition of a styrene polymer and a plasticizer free from aromatic constituents which would be suitable for use as a binder and which would provide acceptable adhesion.

DESCRIPTION OF THE INVENTION

The solution provided by the invention is defined in the claims and is characterized in that the styrene polymer contains a relatively large quantity of styrene while the plasticizer is a fatty compound.

The styrene polymer contains styrene or methyl styrene in a quantity of, preferably, more than 30% by weight, in particular more than 50% by weight and, above all, more than 80% by weight of the monomers. Comonomers of styrene or methyl styrene can be acrylates and methacrylates containing 1 to 12 carbon atoms in the alcohol component and, more particularly, 2 to 8 carbon atoms. The acrylates may also contain reactive groups for subsequent crosslinking. Corresponding reactive groups may also contain vinyl comonomers, for example a silane group. The $Si(Alk)_3$ group may be attached to the vinyl group either directly or by a $(CH_2)_n$ radical where n may be a number of 2 to 6 and preferably has a value of 3 or 0. The alkyl groups may contain 1 to 4 carbon atoms and preferably 1 or 2 carbon atoms. Other comonomers can be vinyl esters, maleic acid esters (again containing 1 to 12 and preferably 2 to 8 carbon atoms in the alcohol component), ethylene, acrylamide, acrylic acid, butadiene, acrylonitrile both individually and in the form of mixtures. The molecular weight is above 100,000 g/mole. Commercially available styrene copolymers are: Acronal 290 D, Scopacryl D 343, Ubatol VAF 1539, Acronal S 360 D, Scopacryl PAA D 8875, Acronal S 400, Acronal S 401, Styrofan A 900, Rhodopas DS 913, Joncryl 678, Vinnapas LL 6010 and SAF 54, Neocryl A 621 (styrene/acrylate copolymer), Pliotec LS 1 (styrene/butyl acrylate/methacrylic acid terpolymer), Mowilith DM 611, Mowilith DM 680, Styropor P 555 (pure styrene), Buna EM 2116, Styrolux 684 D, Rhodopas SB 012, (styrene/butadiene copolymer), Novodur P2M, Synthomer VL 10286 (styrene/butadiene/acrylonitrile terpolymer).

The styrene copolymers may be produced by known methods, more particularly by emulsion or bead polymerization. These processes give aqueous dispersions with a concentration of around 40 to 70% by weight of styrene copolymer. However, the styrene copolymers may also be produced in bulk or solution.

It may be regarded as surprising that these aromatic polymers are compatible with the aliphatic fatty compounds. It may also be regarded as surprising—in view of the constant need to dry and degrease the substrate surfaces to ensure firm adhesion—that strength is hardly affected in the process. This is particularly surprising insofar as the content of fatty compounds is not just a few percent, but generally from 0.5 to 60% by weight, preferably from 10 to 50% by weight and, more preferably, from 15 to 40% by weight, based on the binder. The tensile shear strength of adhesives is still >1, preferably >2 and, more preferably, >4 N/mm$^2$ for beechwood.

"Fatty compounds" in the context of the invention are fatty acids, fatty alcohols and derivatives thereof. Their molecular weight is generally above 100 and preferably above 200. The upper limit is 20,000 and preferably 300 to 1,500.

"Fatty acids" in the context of the invention are acids which contain one or more carboxyl groups (—COOH). The carboxyl groups may be attached to saturated, unsaturated, unbranched or branched alkyl radicals containing more than 8 carbon atoms and, in particular, more than 12 carbon atoms. In addition to the —OH, —SH, —C=C—, —COOH, amino, anhydride groups or epoxide groups described above, they may contain other groups, such as ether, ester, halogen, amide, amino, urethane and urea groups. However, carboxylic acids, such as native fatty acids or fatty acid mixtures, dimer fatty acids and trimer fatty acids are preferred. Specific examples of the fatty acids apart from the saturated types are, in particular, the monounsaturated or polyunsaturated acids palmitoleic, oleic, elaidic, petroselic, erucic, ricinoleic, hydroxymethoxystearic, 12-hydroxystearic, linoleic, linolenic and gadoleic acid.

Products emanating from the Guerbet condensation of linear saturated or unsaturated fatty alcohols with subsequent oxidation may also be used as fatty acids. Examples include 2-ethyl hexanoic acid, 2-butyl octanoic acid, 2-hexyl decanoic acid, 2-decyl tetradecanoic acid, 2-tetradecyl octadecanoic acid, 2-hexadecyl-C$_{20}$-acid or mixtures thereof. In addition, isostearic acid as a secondary product of the dimerization of fatty acids is also suitable.

In addition to the naturally occurring fatty acids, polyhydroxyfatty acids may also be used. They may be obtained, for example, by epoxidation of unsaturated fats and oils or esters of fatty acids with alcohols, ring opening with H-active compounds, for example alcohols, amines and carboxylic acids, and subsequent saponification. The fats or oils required as starting material may be both of vegetable origin and of animal origin or may optionally be obtained by particular petrochemical syntheses.

The fatty acids may also be derived from oil- and fat-based raw materials obtainable, for example, by ene reactions, Diels-Alder reactions, transesterifications, condensation reactions, grafting (for example with maleic anhydride or acrylic acid, etc.) and epoxidations. Examples of corresponding raw materials are: a) epoxides of unsaturated fatty acids, such as palmitoleic acid, oleic acid, elaidic acid, petroselic acid, erucic acid, linoleic acid, linolenic acid, gadoleic acid; b) reaction products of unsaturated fatty acids with maleic acid, maleic anhydride, methacrylic acid or acrylic acid; c) condensation products of hydroxycarboxylic acids, such as ricinoleic acid or 12-hydroxystearic acid, and polyhydroxycarboxylic acids.

Not all the fatty acids described above are stable at room temperature. If necessary, therefore, derivatives of the above-mentioned fatty acids, such as esters or amides, may be used for the purposes of the invention.

One preferred embodiment of the invention is characterized by the use of esters or partial esters of the above-mentioned fatty acids with monohydric or polyhydric alcohols. "Alcohols" in the present context are understood to be hydroxyl derivatives of aliphatic and alicyclic saturated, unsaturated, unbranched or branched hydrocarbons. Besides monohydric alcohols, this definition also encompasses the low molecular weight hydroxyfunctional chain extending or crosslinking agents known per se from polyurethane chemistry. Specific examples of low molecular weight types are methanol, ethanol, propanol, butanol, pentanol, decanol, octadecanol, 2-ethyl hexanol, 2octanol, ethylene glycol, propylene glycol, trimethylene glycol, tetramethylene glycol, 2,3-butylene glycol, hexamethylenediol, octamethylenediol, neopentyl glycol, 1,4-bis-hydroxymethyl cyclohexane, Guerbet alcohol, 2-methyl propane-1,3-diol, hexane-1,2,6-triol, glycerol, trimethylol propane, trimethylol ethane, pentaerythritol, sorbitol, formitol, methyl glycoside, butylene glycol, the dimer and trimer fatty acids reduced to alcohols. Alcohols derived from pine resins, such as abietyl alcohol, may also be used for the esterification reaction.

Instead of alcohols, it is also possible to use OH-containing tertiary amines, polyglycerol or partly hydrolyzed polyvinyl esters.

In addition, polycarboxylic acids or hydroxycarboxylic acids may be added for the oligomerization reaction. Examples of such acids are oxalic acid, malonic acid, succinic acid, maleic acid, fumaric acid, glutaric acid, adipic acid, suberic acid, sebacic acid, 1,11-undecanedioic acid, 1,12-dodecanedioic acid, phthalic acid, isophthalic acid, terephthalic acid, hexahydrophthalic acid, tetrahydrophthalic acid or dimer fatty acid, trimer fatty acid, citric acid, lactic acid, tartaric acid, ricinoleic acid, 12-hydroxystearic acid. Adipic acid is preferably used.

Examples of suitable esters besides the partly saponified fats, such as glycerol monostearate, are preferably the natural fats and oils of rape (new and old), sunflowers, soya, linseed, castor, coconuts, oil palms, oil palm kernels and oil trees and methyl esters thereof. Preferred fats and oils are, for example, beef tallow with a chain distribution of 67% oleic acid, 2% stearic acid, 1% hetpadecanoic acid, 10% saturated C$_{12}$ to C$_{16}$ acids, 12% linoleic acid and 2% saturated acids containing more than 18 carbon atoms or, for example, the oil of new sunflowers (NSf) with a composition of around 80% oleic acid, 5% stearic acid, 8% linoleic acid and around 7% palmitic acid. The corresponding epoxides and reaction products with maleic anhydride, for example, may of course also be used. Other examples are partly and completely dehydrated castor oil, partly acetylated castor oil, ring opening products of epoxidized soybean oil with dimer fatty acid.

In addition, fatty acid esters and derivatives thereof obtainable by epoxidation may also be used. Examples of such esters are soybean oil fatty acid methyl ester, linseed oil fatty acid methyl ester, ricinoleic acid methyl ester, epoxystearic acid methyl ester, epoxystearic acid-2-ethylhexyl ester. Preferred glycerides are triglycerides, for example rapeseed oil, linseed oil, soybean oil, castor oil, partly and completely dehydrated castor oils, partly acetylated castor oil, soybean oil epoxide, linseed oil epoxide, rapeseed oil epoxide, epoxidized sunflower oil.

Epoxidized triglycerides of unsaturated fatty acids ring-opened with nucleophiles are preferably used. Nucleophiles are understood to be alcohols such as, for example, methanol, ethanol, ethylene glycol, glycerol or trimethylol propane, amines such as, for example, ethanolamine, diethanolamine, triethanolamine, ethylenediamine or hexamethylenediamine or carboxylic acids such as, for example, acetic acid, dimer fatty acid, maleic acid, phthalic acid or a mixture of $C_{6-36}$ fatty acids.

The fats and oils (triglycerides) may be used both in native form and after thermal and/or oxidative treatment or in the form of the derivatives obtainable by epoxidation or by the addition of maleic anhydride or acrylic acid. Specific examples are palm oil, peanut oil, rapeseed oil, cottonseed oil, soybean oil, castor oil, partly and completely dehydrated castor oils, partly acetylated castor oils, sunflower oil, linseed oil, stand oils, blown oils, epoxidized soybean oil, epoxidized linseed oil, rapeseed oil, coconut oil, palm kernel oil and tallows.

Other suitable derivatives of the above-mentioned fatty acids are the amides which may be obtained by reaction with primary and secondary amines or polyamines, for example with monoethanolamine, diethanolamine, ethylenediamine, hexamethylenediamine, ammonia.

"Fatty alcohols" in the context of the invention are understood to be compounds which contain one or more hydroxyl groups. The hydroxyl groups may be attached to saturated, unsaturated, unbranched or branched alkyl radicals containing more than 8 carbon atoms and, in particular, more than 12 carbon atoms. In addition to the —SH, —C=C—, —COOH, amino, anhydride groups or epoxide groups required for subsequent reaction with the alkylene oxides, they may contain other groups, for example ether, ester, halogen, amide, amino, urea and urethane groups. Specific examples of the fatty alcohols according to the invention are ricinoleyl alcohol, 12-hydroxystearyl alcohol, oleyl alcohol, erucyl alcohol, linoleyl alcohol, linolenyl alcohol, arachidyl alcohol, gadoleyl alcohol, erucyl alcohol, brassidyl alcohol, dimerdiol (=hydrogenation product of dimer fatty acid methyl ester).

Branched alcohols, so-called Guerbet alcohols, emanating from the condensation of linear, saturated or unsaturated alcohols may also be used. Examples of Guerbet alcohols are 2-ethyl hexanol, 2-butyl octanol, 2-hexyl decanol, 2-tetradecyl octadecanol, 2-hexadecyl-$C_{20}$-alcohol, also isostearyl alcohol and mixtures resulting from the guerbetization of technical alcohols.

Symmetrical and asymmetrical ethers and esters with mono- and polycarboxylic acids may be used as derivatives of the fatty alcohols. Monocarboxylic acids are understood to be formic, acetic, propionic, butyric, valeric, caproic, oenanthic, caprylic, pelargonic, capric, undecanoic, lauric, tridecanoic, myristic, pentadecanoic, palmitic, margaric, stearic, nonadecanoic, arachic, behenic, lignoceric, cerotic and melissic acid. Polycarboxylic acids are, for example, oxalic acid, adipic acid, maleic acid, tartaric acid and citric acid. At the same time, the fatty acids described above, for example oleic acid oleyl ester, may be used as the carboxylic acid.

The fatty alcohols may also be etherified, more especially with polyhydric alcohols, for example alkyl polyglycosides, dimer diol ethers.

The ratio by weight of the styrene polymer to the plasticizing fatty compound is 100:0.5 to 50, preferably 100:2.5 to 40 and, above all, 100:7.5 to 15.

Besides these two key components, the binders according to the invention may contain other ingredients, for example antioxidants, pigments, fillers, plasticizers, preservatives, defoamers, film-forming agents, fragrances, water, adhesion promoters, solvents, dyes, flameproofing agents, flow controllers, resins, tackifiers, viscosity regulators, dispersion aids (for example sodium or ammonium salt of polyacrylic acid), emulsifiers (for example alkyl ether phosphates and sulfosuccinates) and thickeners (for example MC, HEG).

Suitable resins are polyisobutylene or polybutylene (for example Hyvis 10, a product of BP), pine resins and derivatives (esters, hydrogenated products, abietyl alcohol), acrylate resins, phenolic resins, terpene/phenol resins, polyterpenes, epoxy resins, hydrocarbon resins, indene/coumarone resins and melamine resins.

Examples of suitable antioxidants are phosphorous acid and salts thereof, hypophosphorous acid and salts thereof, ascorbic acid and derivatives thereof (especially ascorbyl palmitate), tocopherol and derivatives thereof, mixtures of ascorbic acid derivatives and tocopherol derivatives, sterically hindered phenol derivatives, especially BHA (tert.butyl4-methoxyphenol) and BHT (2,6ditert.butyl4-methylphenol), gallic acid and derivatives thereof, especially alkyl gallates, aromatic amines, for example diphenylamine, naphthylamine and 1,4-phenylenediamine, dihydroquinoline, organic sulfides and polysulfides, dithiocarbamates and mercaptobenzimidazole.

Examples of viscosity regulators are cellulose ethers, hydrogenated castor oil, highly dispersed silicas and ionic and nonionic thickeners such as, for example, polyacrylic acid and associated thickeners.

Suitable fillers and pigments are chalk, heavy spar, kaolin, carbon black, gypsum, aerosil, silica gel, kaolins, talcum, graphite, metal oxides of aluminium, iron, zinc, titanium, chromium, cobalt, nickel, manganese, etc., optionally as mixed oxides, chromates, molybdates, carbonates, silicates, aluminates, sulfates, native fibers, cellulose, wood chips, phthalocyanines and silica flour.

In a preferred embodiment, the fatty compounds are used as sole plasticizers. In particular, no polyalkylene oxides or oleochemical derivatives thereof are used as plasticizers.

The binder according to the invention is generally prepared from the starting materials as follows:

The plasticizer according to the invention may be added to the polymer or to the polymer dispersion after, during or before the polymerization reaction. The formulations are generally produced by initially introducing the polymer or the polymer dispersion and then adding the other components with stirring (optionally at elevated temperature).

The binder may be liquid, paste-like or solid at room temperature (20° C.). In one particular embodiment, it is liquid and best assumes the form of an aqueous dispersion with a solids content of 20 to 85% by weight, preferably 35 to 80% by weight and more preferably 45 to 75% by weight.

The solids content for emulsions or suspensions of the binder according to the invention is between 20 and 75% by weight and preferably between 40 and 60% by weight.

The plasticizers according to the invention can generally bring about the following changes to the styrene polymer:

The glass transition temperature is reduced.
The copolymer is tackified.
The viscosity is partly increased and partly reduced.
Breaking elongation is drastically increased.
Elongation under maximal force is also greatly increased which is indicative of rubber-elastic behavior.

However, it is of particular importance that these effects are permanent, i.e. no migration of the plasticizer was observed after 3 weeks at 60° C. This is confirmed by the following test: the films were stored between sheets of silicone paper for 3 weeks at 60° C. and were evaluated for staining of the paper at intervals of 3 days.

By virtue of these properties, the compositions according to the invention are suitable as binders for the production of adhesives, sealing compounds and coating compositions.

Specific examples of adhesives are hotmelt adhesives, solvent-based adhesives, dispersion adhesives, assembly adhesives, pressure-sensitive and contact adhesives and also redispersion powders, multipurpose adhesives and adhesive sticks. Materials which may be bonded with these adhesives include paper, paperboard, wood, textiles, wall coverings, tiles, labels, leather, rubber, plastics, glass, ceramic and metal. Examples of coatings include plastisols, dispersion paints and the insulation of roofs. The sealing compounds may be used both in the building industry and in the automotive industry. The composition according to the invention may also be added to hydraulic binders, for example cement or gypsum, to elasticize them or improve their adhesion.

The invention is illustrated by the following Examples:

EXAMPLES

Series A

I. Starting materials

1. Acronal 290 D = 50% aqueous dispersion of a styrene/butyl acrylate copolymer (anionic)
2. SO-Epox = epoxidized soybean oil
3. SO-Epox DFA = reaction product of epoxidized soybean oil with dimer fatty acid in coco-2-ethylhexyl ester,
4. MeRi = ricinoleic acid methyl ester,
5. MeTiO5 = oleic acid methyl ester
6. OLM-Epox = oleic acid methyl ester, epoxidized
7. MPG-Ester = ester of head-fractionated fatty acid with monophenyl glycol
8. CEH = coco-2-ethylhexyl ester,
9. RME = rapeseed oil fatty acid methyl ester II. Production of the Compositions 100 Parts by weight of Acronal 290 D were mixed with the quantities of fatty compounds shown in the Table in a glass beaker for 30 minutes at 60° C. until the dispersion appeared homogeneous.

III. Testing of the Compositions

The samples tested were produced as follows: the modified dispersions were introduced into molds and placed in an incubating cabinet at 40° C. to form films, stored for 7 days in a standard conditioning atmosphere (23° C./50% air humidity) and then measured.

The solids concentration (SC) was determined as follows: 5 to 10 g of the sample were placed in an aluminium dish and heated for 2 hours at 120 to 130° C. The sample was then reweighed.

Viscosity (visc.) was determined as follows: Brookfield RVT (20° C.).

Elongation was determined under the following conditions: Instron 4302, automatic material testing system series IX, sample width 5 mm, sample thickness 1 mm, sample length 15 mm, traction rate 200 mm/min. elongation under maximum force and at break was determined. The force indicates the breaking stress.

The compatibility of the components (exudation) was determined as follows: the films were stored between sheets of silicone paper at 60° C. and, after 3 weeks, were evaluated for staining of the paper.

The glass transition temperature (TG) was determined as follows: measuring cell DSC 910 with DuPont 2100, Al crucible with cover, 3 l/h $N_2$ 20 K/min.

Contact tackiness (CT) was determined as follows: a steel ball (diameter 20 mm, weight 32.25 g) rolled down a ramp (height 26 mm, length 115 mm) onto a film of the composition according to the invention. The distance travelled along the polymer film was measured (in mm).

The individual results are set out in the Table and show the following:

The aliphatic plasticizers are compatible with the aromatic copolymers (no exudation).

The glass transition temperature is greatly reduced. Values below −10° C. and even below −20° C. are obtained.

The compositions were tackified by an addition of around 10%.

In general, viscosity is greatly increased although it may remain the same or may even fall.

Elongation at break increases, in some cases very considerably.

TABLE 1

| Sample No. | Additive type | Quantity % | SC | Visc. (mPas) | Elongation at max. force % | Elongation at break % | Force N/mm² | Exudation | TG ° C. | BS |
|---|---|---|---|---|---|---|---|---|---|---|
| 1. | None | 0 | 51.25 | 7500 | 1598 | | 57.80 | No | 21 | |
| 2. | SO-Epox | 15 | 59.10 | 25000 | | 5252 | | No | −20 | |
| 3a. | SO-Epox/DFA | 2.5 | 51.38 | 20000 | 4133 | 4140 | 39.90 | | | |
| 3b. | SO-Epox/DFA | 5 | 53.41 | 35000 | 5519 | 5522 | 19.60 | | | |
| 3c. | SO-Epox/DFS | 7.5 | | 60000 | 5569 | 5564 | 12.30 | | 2 | |
| 3d. | SO-Epox/DFA | 15 | | 68000 | 7240 | 7245 | 5.00 | | −9 | 47 |
| 3e. | SO-Epox/DFA | 20 | | 58000 | 7091 | 11340 | 3.70 | | −15 | |
| 4. | Paint-quality linseed oil | 7.5 | 55.90 | 36000 | 4886 | 4891 | 8.70 | | | |
| 5. | MeRi | 15 | 56.85 | 83000 | 1798 | 4840 | 2.10 | No | | 11 |
| 6. | OLM | 7.5 | 52.24 | 17500 | 5893 | 5881 | 5.80 | No | | 15 |
| 7. | OLM-Epox | 7.5 | 53.55 | 29500 | 4401 | 4406 | 6.50 | No | | 26 |
| 8. | MPG-Ester | 7.5 | 53.41 | 28000 | 1736 | 3321 | 5.50 | No | | 30 |
| 9. | CEH | 15 | | 26750 | 6455 | 9975 | 3.20 | No | | |
| 10. | Castor oil | 7.5 | 58.53 | 44000 | 4609 | 4620 | 10.50 | | −2 | |
| 11. | RME | 15 | 52.33 | 35000 | 6244 | 8915 | 3.00 | No | | |
| 12. | Rapeseed oil | 7.5 | 55.23 | 36000 | 5032 | 5032 | 22.10 | | | |

Series B 92.5 Parts by weight of Acronal 290 D were mixed with 7.5 parts by weight of fatty compounds as in series A and the resulting mixture was processed to form a film. The following results were obtained:

| Fatty compound | Visc. (mPas) | Film properties | Wet tack | TG (° C.) |
|---|---|---|---|---|
| Lauric acid methyl ester | 36000 | Transparent, highly tacky | Very stringy | −11 |
| Myristic acid methyl ester | 37000 | Transparent, highly tacky | Very stringy | −13 |
| Palmitic acid methyl ester | 40000 | Transparent, slightly tacky | No | −15 |
| Stearic acid methyl ester | 20000 | Slightly cloudy, non-tacky | No | −10 |

Series C

90 Parts by weight of Acronal 290 D were mixed with 10 parts by weight of fatty compounds in a glass beaker for 30 minutes at 60° C. until the dispersion appeared homogeneous. Films were then formed by introducing the dispersions into molds at 40° C. and storing the molds in a drying cabinet for 7 days at 23° C./50% relative air humidity.

In the following cases, the films were extremely tacky, rubber-elastic and transparent: glycerol tricaprylate, ring opening product of epoxystearic acid methyl ester with methanol or acetic acid and dimer fatty acid dimethyl ester.

The films were slightly tacky, transparent and rubber-elastic in the following cases: reaction product of epoxystearic acid methyl ester with succinic acid, with glycol (2:1) and with ricinoleic acid butyl ester and also with erucic acid methyl ester.

Tacky, transparent and rubber-elastic films were obtained with Ocenol 90/95 (acetylated). Ocenol is an unsaturated $C_8$ fatty alcohol with an iodine value of 90 to 95.

Slightly clouded, extremely tacky and rubber-elastic films were obtained with reaction products of epoxystearic acid methyl ester with trimethylol propane (TMP, 3:1) or with succinic acid monomethyl ester (1:1).

None of the films "exuded" the plasticizer. To this end, the films were placed between sheets of silicone paper at 60° C. and, after 3 weeks, the paper was examined for fatty stains.

Series D

3 Parts by weight of epoxystearic acid methyl ester were added with stirring to 7 parts by weight of Mowilith DM 680 (aqueous dispersion of homopolystyrene) and stirred for 30 minutes at 60° C. The homopolystyrene was thus rendered extremely tacky and rubber-elastic. The viscosity of the dispersion at 20° C. was only 1850 mPas. By contrast, a comparison test in which dibutyl phthalate was used as plasticizer produced a viscosity of 5500 mPas at 20° C. Homogeneous films could not be formed. The product was brittle and friable.

Series E

I. Dissolving Behavior of Pine Resins in Fatty Acid Esters

8 Parts of non-crystallizing balsamic resin (Resitherm CA) were dissolved at 80° C. in 2 parts of various oleochemical substances and monophenyl glycol (as reference). The viscosity was then measured at that temperature and, after cooling to room temperature, the solution was evaluated for consistency.

TABLE 3

| Sample No. | Solvent | Viscosity at 80° C. (Brookfield, RVT) | Consistency at room temperature |
|---|---|---|---|
| 1 | Myristic acid methyl ester | 550 | Medium viscosity |
| 2 | Oleic acid methyl ester | 625 | Highly viscous to solid |
| 3 | Epoxystearic acid methyl ester | 750 | Highly viscous to solid, separates |
| 4 | Ricinoleic acid methyl ester | 900 | Highly viscous to solid |
| 5 | Coco-2-ethylhexyl ester | 800 | Highly viscous to solid |
| 6 | Lauric acid methyl ester | 275 | Medium viscosity |
| 7 | Palmitic acid methyl ester | 600 | Highly viscous to solid |
| 8 | Epoxystearic acid 2-ethylhexyl ester | 525 | Highly viscous to solid, separates |
| 9 | Monophenyl glycol | 475 | Medium viscosity |

The tests show that, besides their plasticizing effect on styrene polymers, the fatty derivatives, more especially those with low molecular weights of 200 to 400 and with one or more ester functions, have excellent dissolving properties for the pine resins normally used in flooring adhesives.

II. Use of the Resin Solutions in Flooring Adhesives

| 1. Basic mixture | Parts by weight |
|---|---|
| Styrene acrylate (50% SC) | 24.0 |
| Dispersion auxiliaries and emulsifiers | 2.5 |
| Defoamer | 0.02 |
| Preservative | 0.02 |
| Butyl triglycol | 1.0 |
| Water | 5.0 |
| Acrylate thickener (25% SC) | 0.2 |
| Filler (chalk) | 48.0 |
| Resin solution | 16.0 |
| Water | See Examples |
| Total: | See Examples |

| 2. Resin solution | Example 1 | Example 2 | Example 3 |
|---|---|---|---|
| Pine resin | 85.0 | 85.0 | 85.0 |
| Rapeseed oil | 15.0 | 0.0 | 0.0 |
| Lauric acid methyl ester | 0.0 | 15.0 | 0.0 |
| Myristic acid methyl ester | 0.0 | 0.0 | 15.0 |
| Water | 1.1 | 1.7 | 1.0 |
| Total: | 97.84 | 98.44 | 97.74 |

| 3. Properties: | | | |
|---|---|---|---|
| Viscosity; Haake VT 181 [mPas] | 13600 | 14000 | 10400 |
| pH Value | 7.0 | 7.2 | 7.1 |
| Solids content (105° C., 24 h) | 76.1 | 75.6 | 76.2 |
| Open time [mins.] | 20 | 20 | 25 |
| Peel resistance DIN 53278 [N/cm]: | | | |
| Textile covering with foam backing | MF | MF | MF |
| Textile covering with synth. secondary backing | 13 | 12 | 10 |

MF = Material failure in the covering

Series F 10 g of the fatty compound are added to 90 g of a dispersion of styrene/butyl acrylate copolymer (Acronal 290 D, a product of BASF) and mixed for 1.5 mins. with an Ultra-Turrax T 25 at a rotational speed of 240 001/min. A film was cast from the mixture by exposure to ambient air at room temperature. The following results were obtained after storage for 6 weeks.

TABLE 4

Modified Acrylate Dispersions

| Sample No. | Additive | Clouding | Hardness | Elasticity | Resilience | Ultimate tensile strength | Tackiness |
|---|---|---|---|---|---|---|---|
| 7 | None | None | Hard | Very low | Slight | Very high | None |
| 8 | Ca Stearate | Opaque | Hard | Very low | — | High | None |
| 9 | Glycerol monooleate | Slightly cloudy | Soft | High | High | High | Medium |
| 10 | Castor oil | Slightly cloudy | Soft | High | High | Medium | Medium |
| 11 | Soybean oil | Opaque | Soft | Medium | Medium | Medium | Medium |
| 12 | Dericolenöl 70[a] | Opaque | Soft | Medium | Medium | Medium | Slight |
| 13 | Paint-quality linseed oil | Clear | Soft | Medium | Medium | Medium | Medium |
| 14 | Sovermol-POL-1068-I[b] | Slight | Soft | High | High | High | Slight |

[a]Dericolenöl 70 = Partly dehydrated castor oil (Henkel KGaA)
[b]Sovermol-POL-1068-1 = Reaction product of soybean oil epoxide and methanol (Henkel KGaA)

Series G

The following composition (in % by weight) is eminently suitable for use as a joint sealing compound:

28.45 Acronal 290 D
3.00 epoxystearic acid methyl ester
65.00 chalk
0.25 ammonia
2.00 water
1.00 TiO$_2$
0.30 wetting agent After storage for 4 weeks in a standard conditioning atmosphere, test specimens were produced and tested in accordance with DIN 18540.

Resilience amounts to 22% when the test specimen is stretched by 100% and allowed to relax for 1 hour after 24 hours at room temperature.

Elongation at break and the E 100 modulus were determined in accordance with DIN EN 28339, method A, at 23° C. The following results were obtained (the E 100 modulus is the stress/strain value at 100% elongation).

|  | Elongation at break [%] | E 100 Modulus |
|---|---|---|
| Concrete | 120 | 0.04 |
| Wood | 130 | 0.05 |
| PVC | 105 | 0.015 |
| Aluminium | 185 | 0.06 |

What is claimed:

1. An aqueous dispersion, liquid or spreadable at 20° C., and useful as a binder, sealing or coating composition, consisting essentially of water, a homopolymer or copolymer of styrene containing at least 30% by weight of styrene or methyl styrene, and a fatty compound, wherein a ratio by weight of the styrene polymer or styrene copolymer to the fatty compound is from 100:0.5 to 100:15 wherein said fatty compound comprises at least one member selected from the group consisting of fatty acids, fatty alcohols, and derivatives thereof, wherein the fatty acids and fatty alcohols contain an aliphatic group having more than 12 carbon atoms and, optionally a member selected from the group consisting of antioxidants, pigments, fillers, preservatives, defoamers, film forming agents, fragrances, adhesion promoters, solvents, dyes, flameproofing agents, flow controllers, resins, tackifiers, viscosity regulators, dispersion aids, emulsifiers and mixtures thereof, and wherein said aqueous dispersion has a solids content of 20% to 85% by weight and the dried aqueous dispersion is non-staining when stored between sheets of silicone paper for three weeks at 60° C.

2. An aqueous dispersion as in claim 1 wherein said derivatives comprise triglycerides of higher fatty acids.

3. An aqueous dispersion as in claim 1 wherein said fatty compound has a molecular weight of from 200 to 20,000.

4. An aqueous dispersion as in claim 1 wherein the ratio by weight of said homopolymer or copolymer of styrene to said fatty compound is 100:2.5 to 100:15.

5. An aqueous dispersion as in claim 1 wherein said homopolymer or copolymer of styrene has a molecular weight of 8,000 to 2,000,000.

6. An aqueous dispersion as in claim 1 wherein said aqueous dispersion has a solids content of 45% to 75% by weight.

7. An aqueous dispersion as in claim 1 wherein said fatty compound has been added to said homopolymer or copolymer of styrene, said homopolymer or copolymer of styrene being in aqueous dispersion form.

8. A process of bonding, coating or sealing a substrate comprising applying to said substrate a coating of the aqueous dispersion of claim 1 wherein when the substrate is to be bonded, contacting the coated portion of the substrate to a second substrate to be bonded.

9. A process as in claim 8 wherein said homopolymer or copolymer of styrene contains at least 50% by weight of styrene or methyl styrene.

10. A process as in claim 8 wherein said fatty compound has a molecular weight of from 300 to 20,000.

11. A process as in claim 8 wherein the ratio by weight of said homopolymer or copolymer of styrene to said fatty compound is 100:2.5 to 100:15.

12. A process as in claim 8 wherein said homopolymer or copolymer of styrene has a molecular weight of 8,000 to 2,000,000.

13. A process as in claim 8 wherein said aqueous dispersion has a solids content of 45% to 75% by weight.

14. A process as in claim 8 wherein said fatty compound has been added to said homopolymer or copolymer of styrene before, during or after preparation of said homopolymer or copolymer of styrene, said homopolymer or copolymer of styrene being in aqueous dispersion form.

15. A process as in claim 8 wherein said substrate is selected from wood, paper, paperboard, wallpaper, cork, leather, felt, textiles, plastics, floor coverings, minerals, and metals.

16. A process as in claim 8 wherein said fatty compound is selected from the group consisting of fatty acids, fatty alcohols, and derivatives thereof.

17. A process as in claim 16 wherein said derivatives comprise triglycerides of higher fatty acids.

18. An aqueous dispersion liquid or spreadable at 20° C. binder composition consisting essentially of water, a homopolymer or copolymer of styrene containing more than 80% by weight of styrene residues, a fatty compound, wherein a ratio by weight of the styrene or styrene copolymer to the fatty compound is from 100:2.5 to 100:50 wherein the fatty compound comprises at least one member selected from the group consisting of fatty acids, fatty alcohols and derivatives thereof, wherein the fatty acids and fatty alcohols contain an aliphatic group having more than 12 carbon atoms, and optionally a member selected from the group consisting of antioxidants, pigments, fillers, preservatives, defoamers, film forming agents, fragrances, adhesion promoters, solvents, dyes, flameproofing agents, flow controllers, resins, tackifiers, viscosity regulators, dispersion aids, emulsifiers and mixtures thereof, wherein the aqueous dispersion has a solids content of 20% to 85% by weight.

19. The binder composition of claim 18 wherein the fatty compound has a molecular weight of from 200 to 1,500.

20. The binder composition of claim 18 having a solids content of from 20% to 75% by weight.

21. The binder composition of claim 18 wherein the homopolymer or copolymer of styrene has a molecular weight of 8,000 to 2,000,000.

22. The binder composition of claim 18 wherein the fatty acid derivative comprises triglycerides of the fatty acids.

* * * * *